United States Patent [19]
Evans et al.

[11] Patent Number: 5,875,275
[45] Date of Patent: Feb. 23, 1999

[54] METHODS OF CONNECTING AN OPTICAL FIBER AND METHODS OF PROVIDING RADIATION FROM AN OPTICAL FIBER

[75] Inventors: William James Evans; Thomas Henning, both of San Francisco, Calif.; Kelly Cox, Ithaca, N.Y.; Victor C. Esch, Sunnyvale, Calif.; Yefim Gelfond, San Ramon, Calif.; Stephanos Papademetriou, Sunnyvale, Calif.; Daren L. Stewart, Redwood City, Calif.

[73] Assignee: Indigo Medical, Inc., Palo Alto, Calif.

[21] Appl. No.: 979,387

[22] Filed: Nov. 26, 1997

Related U.S. Application Data

[63] Continuation of Ser. No. 915,546, Aug. 13, 1997, Pat. No. 5,802,229, which is a continuation of Ser. No. 551,009, Oct. 31, 1995, abandoned.

[51] Int. Cl.[6] .................................................. G02B 6/36
[52] U.S. Cl. ............................................................ 385/88
[58] Field of Search ............................... 385/80–90, 76; 174/74 R

[56] References Cited

U.S. PATENT DOCUMENTS

| | | | |
|---|---|---|---|
| 4,167,303 | 9/1979 | Bowen et al. | 385/59 |
| 4,222,664 | 9/1980 | Beasley | 356/73.1 |
| 4,273,109 | 6/1981 | Enderby . | |
| 4,295,043 | 10/1981 | Eibner et al. . | |
| 4,307,934 | 12/1981 | Palmer . | |
| 4,526,170 | 7/1985 | Tanner | 606/7 |
| 4,553,813 | 11/1985 | McNaughton et al. . | |
| 4,665,529 | 5/1987 | Baer et al. . | |
| 4,669,820 | 6/1987 | Berge | 385/78 |
| 4,697,861 | 10/1987 | Mitchell . | |
| 4,705,352 | 11/1987 | Margolin et al. . | |
| 4,722,337 | 2/1988 | Losch et al. . | |
| 4,723,257 | 2/1988 | Baer et al. . | |
| 4,733,934 | 3/1988 | Wais et al. . | |
| 4,738,506 | 4/1988 | Abendschein et al. . | |
| 4,740,052 | 4/1988 | Schrott et al. . | |
| 4,785,805 | 11/1988 | Joffe et al. . | |
| 4,834,487 | 5/1989 | Abendschein et al. . | |
| 4,842,363 | 6/1989 | Margolin et al. . | |
| 4,844,071 | 7/1989 | Chen et al. . | |
| 4,895,145 | 1/1990 | Joffe et al. . | |

(List continued on next page.)

FOREIGN PATENT DOCUMENTS

| | | |
|---|---|---|
| 0650082 | 9/1994 | European Pat. Off. . |
| 8708660 | 10/1987 | Germany . |
| 29503807 | 4/1995 | Germany . |
| 63-029711 | 2/1988 | Japan . |
| WO8912244 | 12/1989 | WIPO . |
| WO9109331 | 6/1991 | WIPO . |

*Primary Examiner*—Akm E. Ullah

[57] ABSTRACT

A fiber optic radiation transmission system is provided in which an optical fiber and a radiation source are connected to establish optical communication therebetween. Additionally, a connecting system is provided for connecting an optical fiber and a radiation source such that optical communication is established therebetween. The systems include a connector which carries the optical fiber therein. The connector is extendable within the system toward the radiation source to bring the optical fiber into optical communication with the radiation source. More particularly, the systems are configured in such a way that when the connector is extended sufficiently within the system, it seats the optical fiber relative to the radiation source under bias, thereby establishing a reliable optical connection. Once the optical connection is thus established, the connector engages a connection port associated with the radiation source to secure the system in a fully connected configuration appropriate for use. Thus, in a method of using such a system, the user simply extends the connector until the connector engages the connection port. The present invention thus provides efficient and reliable systems in which optical communication is established between an optical fiber and a radiation source.

50 Claims, 5 Drawing Sheets

U.S. PATENT DOCUMENTS

| | | |
|---|---|---|
| 4,919,508 | 4/1990 | Grace et al. . |
| 4,960,317 | 10/1990 | Briggs et al. . |
| 5,029,970 | 7/1991 | Hengst et al. . |
| 5,073,044 | 12/1991 | Egner et al. . |
| 5,082,344 | 1/1992 | Mulholland et al. . |
| 5,085,492 | 2/1992 | Kelsoe et al. . |
| 5,104,242 | 4/1992 | Ishikawa . |
| 5,116,329 | 5/1992 | Vannus et al. . |
| 5,123,071 | 6/1992 | Mulholland et al. . |
| 5,133,030 | 7/1992 | Lee ............................................. 385/19 |
| 5,136,676 | 8/1992 | Arnett et al. . |
| 5,146,526 | 9/1992 | Sweeney et al. ........................ 385/90 |
| 5,157,750 | 10/1992 | Grace et al. . |
| 5,166,477 | 11/1992 | Erin, Jr. et al. ....................... 174/74 R |
| 5,179,607 | 1/1993 | Sellers et al. . |
| 5,267,993 | 12/1993 | Grace et al. . |
| 5,325,454 | 6/1994 | Perin, Jr. et al. ..................... 174/74 R |
| 5,348,487 | 9/1994 | Marazzi et al. . |
| 5,363,460 | 11/1994 | Marazzi et al. . |
| 5,452,388 | 9/1995 | Rittle et al. ............................... 385/76 |
| 5,452,391 | 9/1995 | Chou et al. . |
| 5,506,922 | 4/1996 | Grois et al. . |
| 5,537,501 | 7/1996 | Iwano et al. . |
| 5,598,495 | 1/1997 | Rittle et al. ............................... 385/76 |

METHODS OF CONNECTING AN OPTICAL FIBER AND METHODS OF PROVIDING RADIATION FROM AN OPTICAL FIBER

This is a continuation of U.S. Ser. No. 08/915,546; now U.S. Pat. No. 5,802,229 which is a continuation application of U.S. Ser. No. 08/551,009, filed Oct. 31, 1995, abandoned.

BACKGROUND OF THE INVENTION

This invention relates to a fiber optic radiation transmission system in which an optical fiber and a source of radiation are connected to establish optical communication therebetween. This invention also relates to a system which is useful for connecting an optical fiber and a source of radiation and establishing optical communication therebetween.

More particularly, the present invention relates to a system, including an optical fiber and a connector, in which the connector brings an end of the optical fiber into optical communication with a radiation source and secures the optical fiber end in this communicating relationship in preparation for use.

Typically, the connecting of an optical fiber and a radiation source has been accomplished by placing a standard ferrule and a standard connector, such as a SMA 905 ferrule and a SMA 905 connector, on the end of the optical fiber, and screwing a nut on the connector onto a correspondingly threaded standard bulkhead connector, such as a SMA 905 bulkhead connector, thereby biasing the ferrule against a shoulder in the bulkhead. This system is disadvantageous in that the nut on the connector is difficult to manipulate when screwing the nut into the bulkhead. Additionally, it is difficult for the user to know whether or not the nut has been screwed in sufficiently to bias the ferrule properly against the shoulder in the bulkhead in order to obtain good optical communication between the optical fiber and the radiation source.

It is a primary object of the present invention to provide a fiber optic radiation transmission system in which an optical fiber and a radiation source are connected in a convenient manner.

It is another object of the present invention to provide an optical fiber connector system in which an optical fiber and a radiation source are connected in a convenient manner.

It is another object of the present invention to provide a system which is useful to establish good optical communication between an end of an optical fiber and a source of radiation.

It is a further object of the present invention to provide an improved method of connecting an optical fiber and a radiation source.

SUMMARY OF THE INVENTION

According to a primary aspect of the present invention, briefly and generally, a fiber optic radiation transmission system is provided which includes a connector for carrying an end of an optical fiber to a source of radiation and biasing the optical fiber end such that it is seated securely with respect to the radiation source. The system is dimensioned to facilitate such a secure seating arrangement and configured to provide optical connection between the seated optical fiber and the radiation source.

More particularly, in the system of the present invention, the optical fiber is positioned within the connector such that the connector carries the optical fiber into seated relation with respect to the radiation source. The connector is configured to provide sufficient biasing force to seat the optical fiber securely relative to the radiation source and thus, to bring the optical fiber into optical communication with the radiation source. In this manner, the connector establishes good optical communication between the end of the optical fiber and the radiation source.

Once such optical communication is provided, a connecting portion of the connector engages the connection port, preferably via a robust and user-friendly snapping mechanism. The connecting portion of the connector is constructed to provide sufficient engagement, or latching, force to balance ejection forces that are created when the optical fiber is biased in its seated relation to the radiation source. Thus, the connector body is useful for securing the optical fiber end in a biased, seated relation to the radiation source and thereby, ensuring that good optical communication therebetween is established in preparation for use.

Additional objects, advantages and features of the present invention will become apparent from the following description of its preferred embodiments, which description should be taken in conjunction with the accompanying drawings.

DESCRIPTION OF PREFERRED EMBODIMENTS

Figure 1:
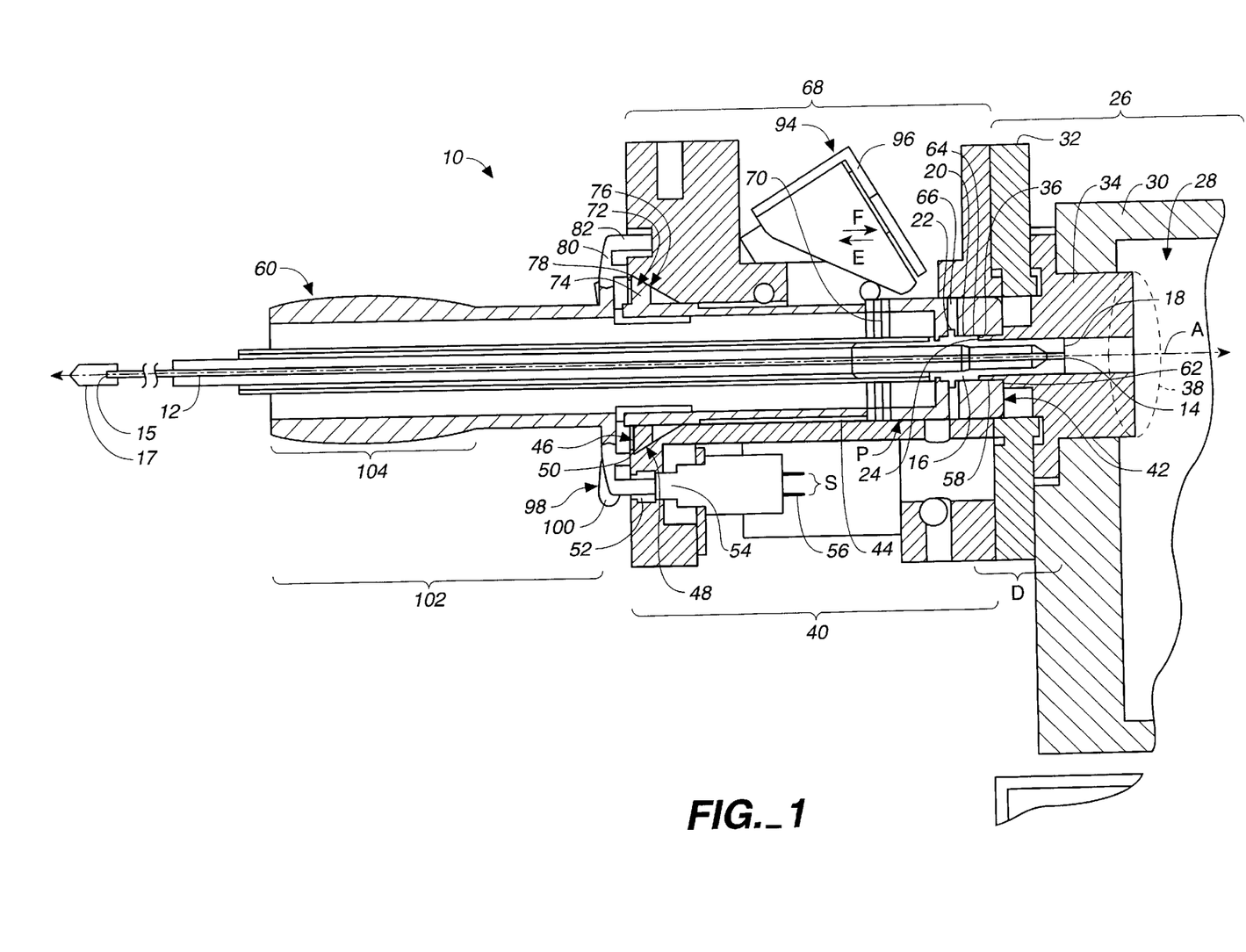
FIG. 1 is a longitudinal, cross-sectional view of a fiber optic radiation transmission system which includes an optical fiber and a source of radiation, shown in a connected configuration, according to the present invention.

A fiber optic radiation transmission system 10 which includes an optical fiber 12 and a source of radiation 26, is illustrated in a connected configuration in FIG. 1, according to the present invention. The system 10 may also be referred to as a system for connecting an optical fiber 12 and a source of radiation 26.

Hereinafter, the terms "proximal" and "distal" used in relation to the system 10 refer to relative spatial locations of features nearest to the left and nearest to the right, respectively, of the system as it is shown, extending along longitudinal axis A, in FIG. 1.

The system 10 includes an optical fiber 12, which may be a standard optical fiber, having a core, typically composed of glass, a cladding, and a jacket. The optical fiber 12 extends along longitudinal axis A, from a distal end 14, which serves as the connection end of the system, to a proximal end 15, which serves as the radiation-transmitting end of the system.

The radiation-transmitting end 15 may terminate in a diffusing tip, such as diffusing tip 17 shown in FIG. 1.

Preferably, the radiation-transmitting end 15 terminates in a light-diffusing device, as disclosed in U.S. patent application Ser. No. 08/550,846, entitled "Light-Diffusing Device for an Optical Fiber, Methods of Producing and Using Same, and Apparatus for Diffusing Light from an Optical Fiber" and filed concurrently herewith by Esch, the entire disclosure of which is incorporated by this reference. Such a preferred light-diffusing device, or radiation emitter, is characterized in that it emits radiation from a surface along a length thereof.

The connection end 14 of the optical fiber 12 may be circumferentially surrounded by a ferrule 16. The ferrule may be a standard ferrule, preferably being a SMA 905 ferrule such as that available from Amphenol Corporation of Lisle, Ill. The ferrule 16 terminates in an open distal end 18 which preferably coincides with connection end 14 of the ferrule-surrounded optical fiber 12, as shown.

As shown in FIG. 1, the ferrule 16 is carried within a connector 60, or connector body, which extends along longitudinal axis A. Preferably, the ferrule is carried coaxially within the connector body 60. The ferrule 16 is positioned within the connector body 60 such that it is accessible through an open distal end 62 of the connector body. By way of example, the distal end 18 of the ferrule 16 may extend beyond a distal end 62 of the connector body, as shown in FIG. 1.

The ferrule 16 is circumferentially and longitudinally seated within the connector body 60. By way of example, the ferrule 16 may have an outer circumference 20 which substantially corresponds to an inner circumference 64 of the connector body 60 so that the ferrule is circumferentially seated, while being freely rotatable, therein. Further by way of example, the ferrule may have an axially extended structure 22, such as an annular lip, which fits into a gap 66 of the connector body, thereby seating the ferrule longitudinally with respect to the connector body. Preferably, the annular lip 22 and the gap 66 are constructed to engage one another in a snap-fit manner, so that the ferrule is simply extended into the connector body sufficiently for a snap-fit connection, as further described in relation to FIG. 5.

The ferrule 16 includes a shoulder 24, or a seating surface, which is preferably an annular structure along the outer circumference 20 of the ferrule. The shoulder 24 is accessible through the distal end 62 of the connector body 60, as shown. The shoulder 24 is located a predetermined distance D from the distal end 18 of the ferrule, the distance D being sufficient to establish optical communication between the connection end 14 of the optical fiber 12 and the radiation source 26 when the system is connected as shown in FIG. 1. As further described herein, the shoulder 24 plays a role in positioning the connection end 14 of the optical fiber 12 relative to the radiation source 26.

The radiation source 26 provides the radiant energy which is transmitted to the optical fiber 12, when the optical fiber is connected in this manner. The radiation source 26 includes a radiation generator and transmitter, generally indicated by reference numeral 28, which is preferably a laser for generating and transmitting light energy. The radiation generator and transmitter 28 may be housed in a housing 30, or an optical bench.

The radiation source 26 is associated with a connection port, such as connection port 46 further described herein. For example, as shown in FIG. 1, the radiation source 26 includes a bulkhead 32 which opens onto and communicates with a connection port assembly 40. Disposed within the bulkhead 32 is a bulkhead connector 34 which receives a distal end 62 of the connector body 60, such that the connection end 14 of the optical fiber 12 is carried by the connector body into optical communication with the radiation source 26.

The bulkhead connector 34 has a seating surface 36 of a construction sufficient to provide a seat for the shoulder 24, or seating surface, of the ferrule 16. Preferably, the seating surface 36 has a shape that substantially corresponds to that of the ferrule shoulder 24, so that the ferrule shoulder seats well against the seating surface. Preferably, the shoulder 24 and the seating surface 36 are corresponding planar surfaces, which are vertical relative to longitudinal axis A of the system 10, as shown in FIG. 1.

The connection end 14 of the optical fiber 12 is positioned within the ferrule 16 such that when the ferrule shoulder 24 is seated against the seating surface 36 of the bulkhead connector 34, the optical fiber is in optical communication with the radiation source 26. For example, as shown in FIG. 1, the connection end 14 extends beyond the ferrule shoulder 24 a distance D which corresponds to a distance appropriate for establishing optical communication between the optical fiber 12 and the radiation source 26 when the shoulder 24 is seated against the seating surface 36 of the bulkhead connector 34.

In system 10, good optical communication is established or ensured by seating the ferrule shoulder 24 against the seating surface 36 under bias, as further described in relation to the connector body 60. As the ferrule shoulder 24 is pressured against the seating surface 36, the seating relationship is firmly established, as is the resulting optical communication between the optical fiber 12 and radiation source 26. In this manner, the system 10 provides reliable optical communication between the optical fiber 12 and the radiation source 26.

Figure 5:
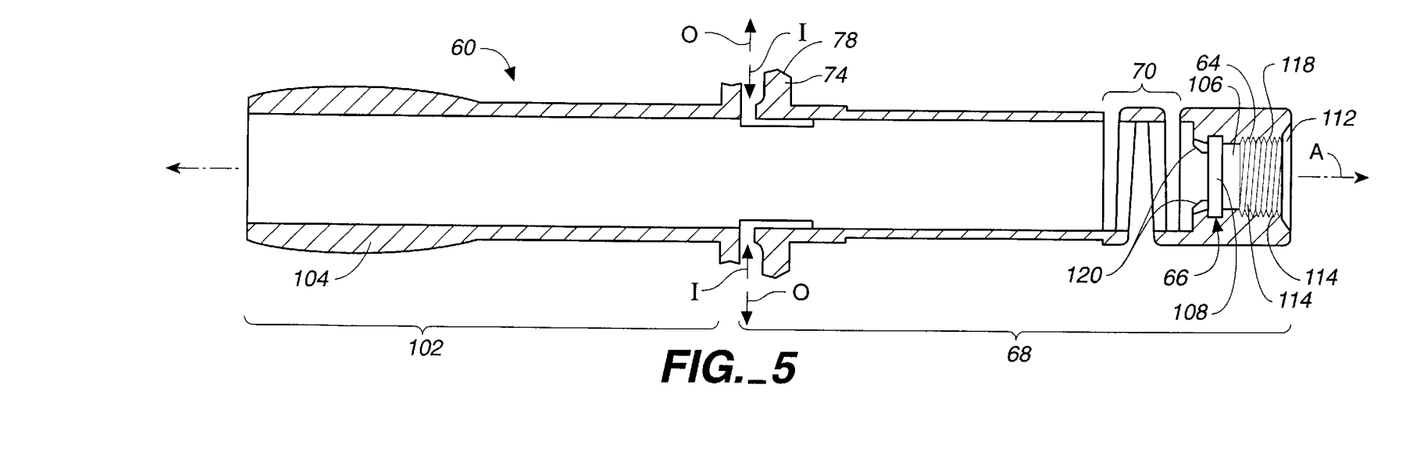
FIG. 5 is an illustration of a connector body and a connection port of the connecting system of FIG. 1, according to an aspect of the present invention.

The connecting system 10 of the present invention may be constructed to accommodate a standard SMA 905 bulkhead having a SMA 905 bulkhead connector for mating with a SMA 905 ferrule, as further described in relation to FIG. 5. Preferably, the bulkhead 32 is an adaptation of the standard SMA 905 bulkhead, in which the threads on outer circumference of the SMA 905 bulkhead connector are removed, or machined down to their root diameter, so that the distal end 62 of the connector body 60 fits over a relatively smooth outer circumference 58 of the bulkhead connector 34 without, or with minimal, resistance, as shown in FIG. 1.

The bulkhead connector 34 may also serve as a holder for a focusing device, represented by dashed line 38, such as a lens. In such a configuration, the focusing device 38 may be held at the distal end of the lens holder 34. The focusing device 38 is used to focus radiation from the radiation source 26 sufficiently for transmission to the optical fiber 12. In a preferred configuration, the bulkhead connector 34 holds a lens 38 sufficient for focusing radiation from the laser 28 of the radiation source 26 for transmission to the optical fiber 12, when the optical fiber is seated relative to the radiation source.

Figure 3:
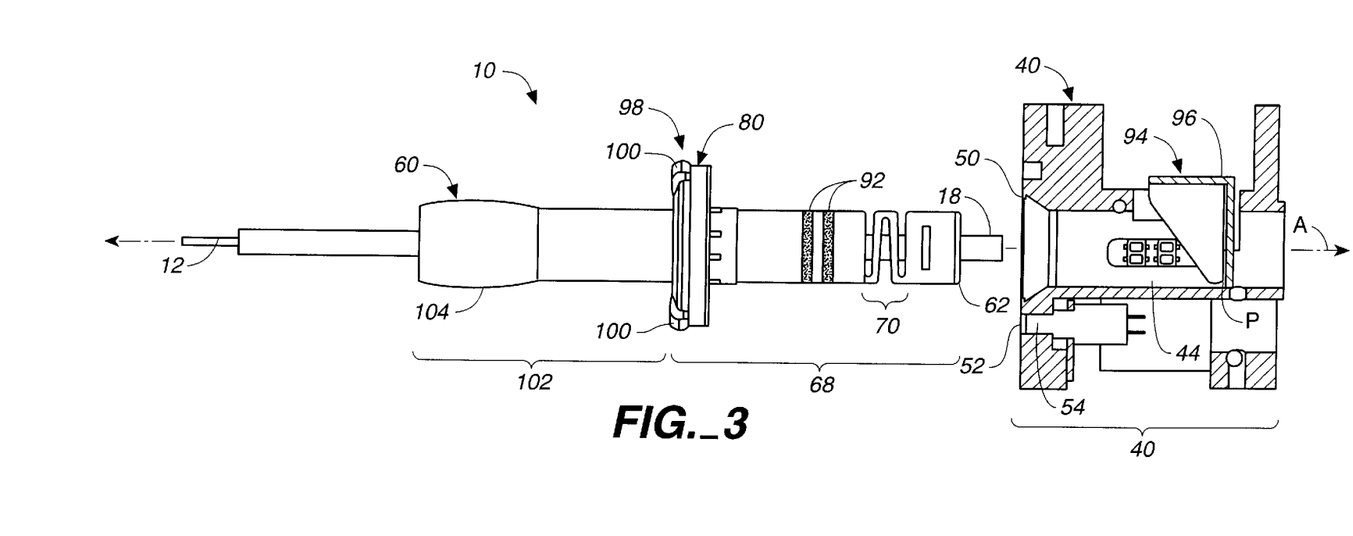
FIG. 3 is a longitudinal, side-elevational view of the connecting system of FIG. 2, wherein a connection port assembly of the system is shown in cross-section.

The radiation source 26 opens onto and communicates with a connection port assembly 40 via the bulkhead 32, as shown in FIG. 1. The connection port assembly 40, or connection block, has an opening 42 at its distal end which communicates with the bulkhead 32, and another opening 46, or connection port, at its proximal end. The connection port is of a construction sufficient to engage a connecting portion 72 of the connector body 60, as further described in relation to the connector body. As shown in FIGS. 1 and 3, the connection port assembly 40 defines a channel 44, between the opening 42 and the connection port 46, which is adapted to receive a distal portion 68 of the connector body 60 which is extendable therein.

The connection port 46 includes a projection 50 which may be located along its inner circumference 48, as shown in FIG. 1. Preferably, the projection 50 is a lip-type projection located at the outermost edge of the port 46, extending annularly along the entire inner circumference 48 of the port, and projecting a uniform distance into the opening of the port. As further described in relation to the connector body 60, the projection 50 cooperates with the connector body 60 to secure the optical fiber 12 in an optically communicating relationship with the radiation source 26.

Figure 2:
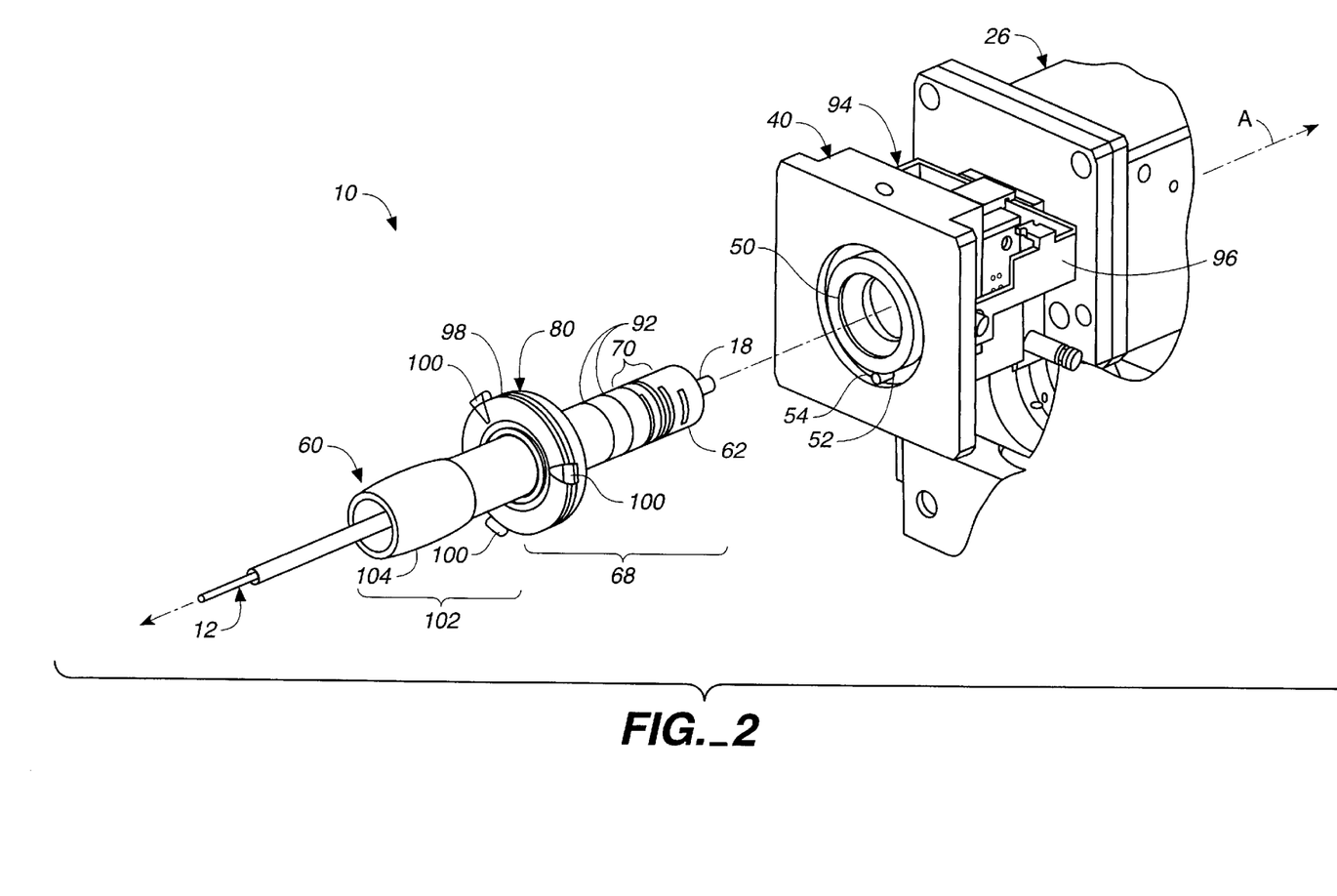
FIG. 2 is an elevational view of a system for connecting an optical fiber and a source of radiation, such as the system of FIG. 1, shown in a disconnected configuration.
Figure 4:
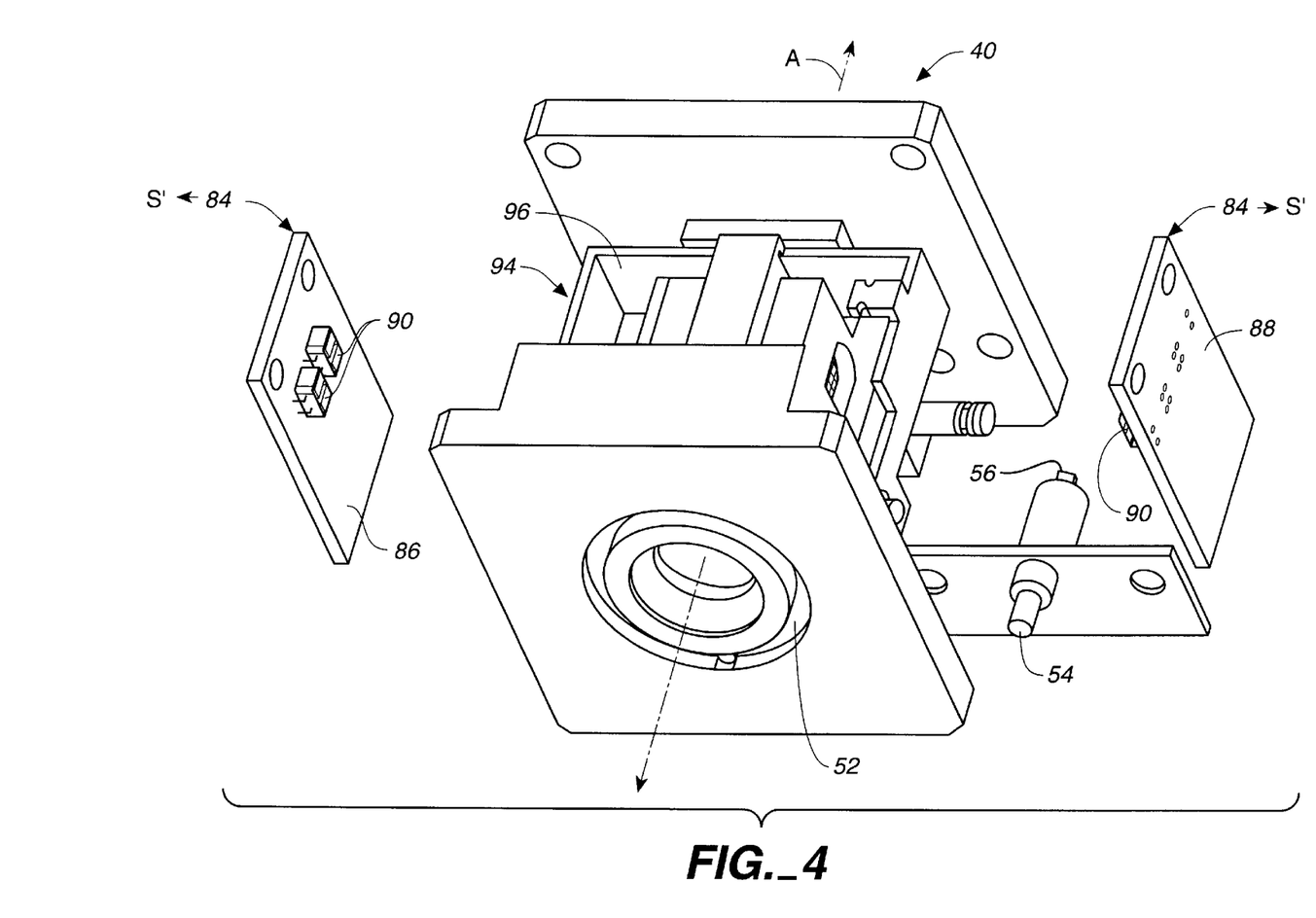
FIG. 4 is an elevational view of a connection port assembly of the connecting system of any of FIGS. 1–3, shown schematically in partial disassembly, according to an aspect of the present invention.

Preferably, the connection port assembly 40 further includes a recess 52, or groove, as shown in FIGS. 1–4. The recess 52 is peripheral to the connection port 46 and, most preferably, is an annular recess circumferentially surrounding the port. Communicating with the recess 52 is a connection verification switch 54 which is passive, for example, naturally extended in an "off" position, when the system is disconnected (as shown in FIGS. 2–4), and activated, for example, depressed from the naturally extended position to an "on" position, when the system is connected (as shown in FIG. 1). The switch 54 is electrically connected to circuitry (not shown) via connection pins 56. The circuitry provides an electrical signal S which indicates whether the switch 54 is passive or activated, and thus, whether the system 10 is disconnected or properly connected, as further described in relation to the connector body 60. The system 10 thus facilitates connection verification.

According to the present invention, a connector body 60 is provided for bringing the connection end 14 of the optical fiber 12 into optical communication with the radiation source 26, applying a biasing force to ensure that the optical connection is established, and securing the optical fiber in such a connecting relationship with the radiation source. While the connector body 60 may be composed of a variety of materials, it is preferably composed of durable plastic.

As described above, the connector body 60 carries the ferrule-surrounded optical fiber 12 so that the connection end 14 thereof extends beyond its distal end 62 for a distance appropriate for establishing optical communication between the optical fiber 12 and the radiation source 26, when the shoulder 24 is brought into contact with the seating surface 36 of the bulkhead connector 34. Thus, when the connector body 60 is sufficiently extended towards the radiation source 26 to establish such contact, the optical fiber 12 is optically connected to the radiation source 26.

More particularly, the connector body 60 includes an extendable distal portion 68, as shown in FIG. 3. The connector body 60 is structured such that the distal portion 68 is sufficiently extendable into the channel 44 to bring the ferrule shoulder 24 into contact with the seating surface 36 of the bulkhead connector 34. In this manner, the connection end 14 of the optical fiber 12 is brought into optical communication with the radiation source 26.

The connector body 60 is also structured such that, once such optical communication is established, the distal portion 68 is sufficiently extendable into the channel 44 to seat the ferrule shoulder 24 under bias, in relation to the seating surface 36. This biased, seated relationship is accomplished via a biasing component 70 of the distal portion 68, which provides a biasing force F, directed distally along longitudinal axis A, sufficient to seat the ferrule shoulder 24 relative to the seating surface 36.

When the connector body 60 is biased in this manner, the biasing component 70 also provides an ejection force E, directed proximally along longitudinal axis A. As further described herein, the ejection force is sufficient to unseat the ferrule shoulder 24 relative to the seating surface 36 when system 10 is not fully connected.

While the biasing component 70 is preferably an integral part of the connector body 60, as described above, it may be a separate part which is added to the connector body. Further, the biasing component 70 may be made of a material that is different than that of the connector body 60, for example, a material of sufficient strength or flexibility to provide appropriate biasing force F.

Preferably, the biasing component 70 is a compression spring which becomes sufficiently compressed (as shown in FIG. 1) when the distal portion 68 is extended to seat the ferrule shoulder 24 against the seating surface 36, to provide a biasing force F which is sufficient to ensure that the optical connection between the connection end 14 of the optical fiber 12 and the radiation source 26 is firmly established.

Figure 6A:
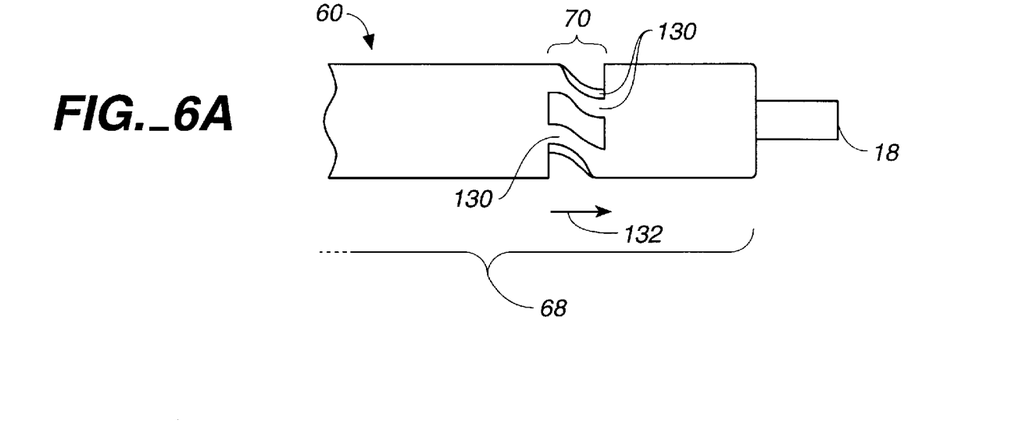
FIGS. 6A–6C are illustrations of a biasing component of a connector body, according to alternate embodiments of the present invention.

In an alternate embodiment, the biasing component 70 may include at least one flexible lever arm 130, as illustrated in FIG. 6A. By way of example, flexible lever arms 130 may be molded as part of the connector body 60 along the distal portion 68. In this embodiment, the lever arms become sufficiently depressed in the forward direction of arrow 132 when the distal portion 68 of the connector body is sufficiently extended to provide the biasing force F described above.

Figure 6B:
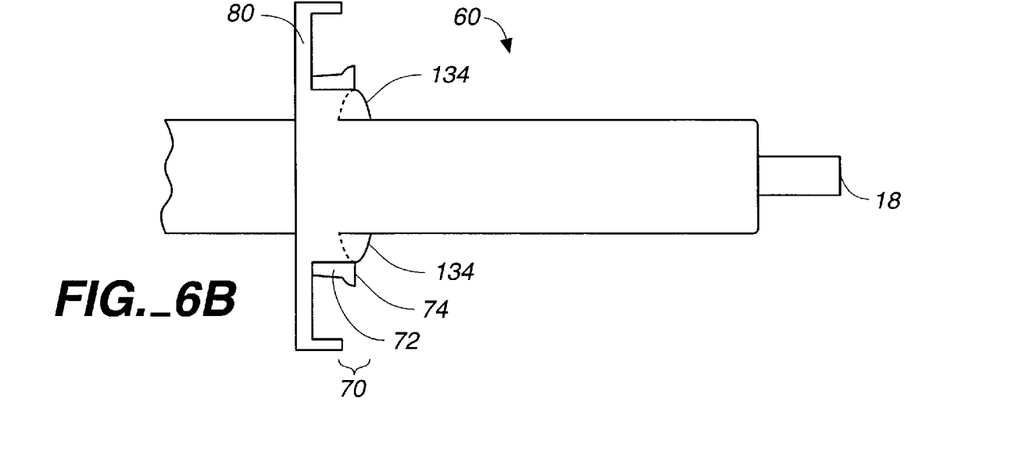

In a further alternate embodiment illustrated in FIG. 6B, the biasing component 70 may comprise a drumhead-type arrangement 134 including a portion which is normally convex (as shown in solid lines) with respect to the distal portion 68 of the connector body and becomes sufficiently concave (as shown in broken lines) with respect to the distal portion when the distal portion is sufficiently extended to provide the biasing force F described above. In this latter embodiment, the drumhead-type arrangement may be formed as a part of a connecting portion 72 of the connector body 60, for example, adjacent to and interiorly disposed relative to an engaging element 74 of the connecting portion, which is further described herein.

Figure 6C:
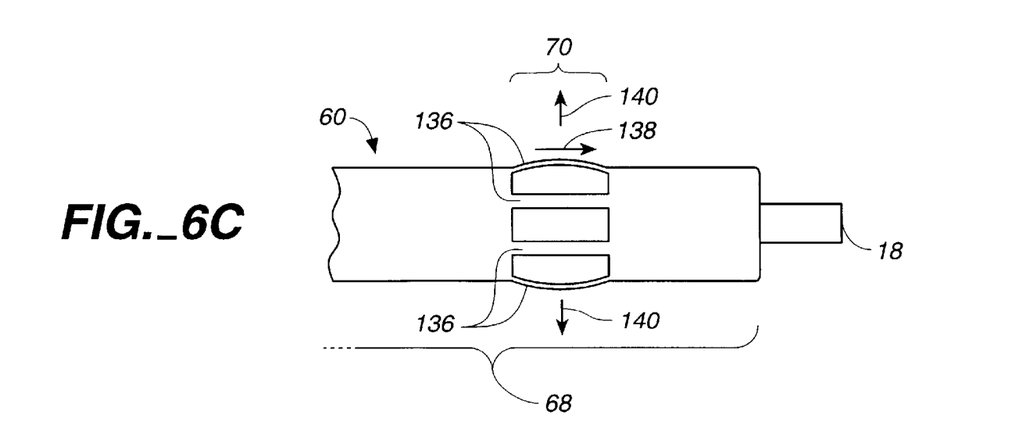

In yet another alternate embodiment illustrated in FIG. 6C, the biasing component 70 may comprise a flexible surface 136. By way of example, the flexible surface 136 may be either solid or segmented (as shown) and molded as part of the connector body 60 along the distal portion 68. In this embodiment, the flexible surface becomes sufficiently compressed in the direction of arrow 138, and thus, extended radially and in the outward direction of arrows 140 relative to the connector body, when the distal portion 68 is sufficiently extended to provide the biasing force F described above.

The connector body 60 is also structured such that, when the ferrule shoulder 24 is seated under bias relative to the seating surface 36, the distal portion 68 is sufficiently extendable into the channel 44 to bring a connecting portion 72 of the connector body 60 into engagement with the connection port 46 of the connection port assembly 40. The system 10 is thus physically connected as shown in FIG. 1, with the connection end 14 of the optical fiber 12 optically connected to the radiation source 26.

As shown in FIG. 1, the connecting portion 72 of the connector body 60 is of a construction sufficient for engagement with the connection port 46. The connecting portion 72 includes an engaging element 74 for engaging the projection 50 of the port 46. The engaging element 74 may be located along the outer circumference 76 of the connecting portion 72 for engagement with the projection 50, when projection 50 is located on the inner circumference 48 of the connection port 46, as shown in FIG. 1. The engaging element 74 is of sufficient construction to provide a holding force which exceeds the ejection force E.

By way of example, the engaging element 74 may include at least one engaging spring 78 along the outer circumference 76 of the connecting portion 72. Preferably, the engaging element 74 includes engaging springs 78, or leaf springs, extending annularly along the outer circumference 76. In this preferred embodiment, the engaging springs 78 fit over the projection 50, which is preferably a lip-type projection, to cause the engaging element to latchingly engage the projection. The engaging springs 78 are thus much like flexible lever arms, ridges or the like, which are displaced inwardly in a radial direction (as schematically depicted by arrows I in FIG. 5) by the projection 50 when the distal portion 68 of the connector body 60 is extended sufficiently into channel 44 and resiliently snap outwardly in a radial direction (as schematically depicted by arrows 0 in FIG. 5) when the distal portion is extended further into the channel such that the engaging springs fit over the projection for engagement therewith. In this manner, the connector body 60 snaps into the connection port 46.

In this preferred embodiment, the engaging springs 78 are precisely dimensioned to provide a latching force sufficient relative to the ejection force E, to maintain engagement with the projection. This ensures that the snap-fit connection is secure when the system 10 is connected as shown in FIG. 1. Preferably, the engaging springs 78 are molded as part of the connector body 60 to provide sufficient integrity in the snap-fit system.

The optical fiber connecting system 10 thus provides an efficient means for establishing optical communication between the optical fiber 12 and the radiation source 26. The connector body 60 is simply extended into the channel 44 until the connecting portion 72 engages the connection port 46, whereby system 10 is fully connected with the optical fiber 12 biased into the bulkhead 32 to be firmly established in optical communication with the radiation source 26. The system 10 is thus easily manipulated to establish such connection, particularly when the preferred snap-fit connection system is employed.

As described above, the connection port assembly 40 preferably includes a recess 52 which communicates with a connection verification switch 54. By way of example, the switch 54 may extend into the recess 52, as shown in FIGS. 1–4. In a preferred embodiment, the connector body 60 carries an element 80 for activating the switch 54. This switch-activating element 80 is of a construction sufficient to fit into the recess 52 and to activate the switch, for example, by the depression thereof, when the connector body 60 is snapped into the connection port 46.

When the connection verification switch 54 is activated, the system 10 provides an electrical signal S indicating that the system is properly connected in preparation for use. However, when the connector body 60 is not snapped into the connection port 46, the system 10 provides no such indication or provides an indication of improper or failed connection. In this manner, the system 10 provides a simple mechanism for verifying that the connector body 60 is properly connected to the connection port 46.

By way of example, when the connector body 60 is under bias, but is released before it engages the connection port 46, the ejection force E acts on the connector body to move it away from the connection port 46. When this occurs, the activating element 80 is not in a position to activate the connection verification switch 54. In such event, the system 10 may provide an electrical signal S to alert the user that the system 10 is not properly connected for use. The system 10 thus provides a built-in safety mechanism which is convenient for the user.

The activating element 80 is preferably an annular structure which circumferentially surrounds the connector body 60, as shown in FIGS. 1–3. The activating element 80 may be molded as part of the connector body 60. However, when the activating element 80 and the connecting portion 72 lie in the same plane as shown in FIG. 1, it is preferable to form them as separate parts of the connector body 60.

The activating element 80 includes a protruding structure 82 dimensioned to fit into the recess 52 and to depress switch 54 when system 10 is connected as shown in FIG. 1. Preferably, the protruding structure 82 is an annular structure which fits into annular recess 52 for depression of the switch 54 disposed in the recess. In this preferred embodiment, the annular protrusion 82 bears against the annular recess 52, thereby stabilizing, or spreading, unintended or undesirable forces acting on the connector body 60 to move the connecting portion 72 thereof out of engagement with the connection port 42. The annular protrusion 82 thus stabilizes the connector body with respect to such anti-connection or dislodging forces. This stabilizing feature is particularly useful with respect to forces which are not coaxial with the optical fiber 12, such as lateral forces.

Preferably, the optical fiber connecting system 10 includes an optical fiber identification system. In this preferred embodiment, the connection port assembly 40 includes a detection device 84, such as that shown in FIG. 4. The detection device 84 carries at least one detector 90 to detect fiber identification information. By way of example, the detector device 84 may include two detector plates 86 and 88 arranged along the channel 44 of the connection port assembly, as shown in FIG. 4. For example, plate 86 may carry two detectors 90 (as shown), while plate 88 may carry three detectors 90 (partially obscured) which face those on opposing plate 86. In this example, the detector device 84 may be configured to detect up to five independent pieces of information, such as 5 bits of information or five binary states, from its five detectors 90. Preferably, the detectors are arranged such that they do not interfere with one another, such as in the non-aligned, or non-overlapping, configuration shown in FIG. 4.

In this preferred embodiment, the connector body 60 carries identifying information 92 on the distal portion 68 thereof. As schematically shown in FIG. 3, the identifying information 92 is arranged on the distal portion 68 so that it is detectable by the detectors 90 when the system 10 is in the connected configuration of FIG. 1.

Preferably, the detectors 90 are digital code sensors and the identifying information 92 includes a digital code which identifies the optical fiber. As shown in FIG. 3, the digital code may be in the form of at least one band located on the distal portion 68 of the connector body 60. Preferably, the digital code is in the form of at least one band that circumferentially surrounds the distal portion 68, so that the distal portion need not be circumferentially aligned upon connection in order for the code to be detected.

In the operation of this embodiment of system 10, the user connects the connector body 60 to the connection port 46 whereupon the detection device 84 detects the identifying information 92 on the connector body 60. Preferably, in the above-described switch-activation embodiment of the system 10, when the connection verification switch 54 is activated, the electrical signal S alerts the system 10 or the user thereof that the system is appropriately configured for optical fiber identification, whereupon the system detects the optical fiber identification information 92.

The detection device 84 may generate a signal S' which indicates what type, or whether or not the proper type, of optical fiber 12 has been connected to the system 10. By way of example, based on the information detected, such as the type of optical fiber 12 connected to the system, the signal S' may provide the system with predetermined operational instructions appropriate for that type of optical fiber, such as irradiation power and time. The system 10 thus provides a built-in safety mechanism which is convenient for the user. Preferably, the system 10 also provides a mechanism by which the user may override these predetermined operational instructions, if desired for safety or other purposes.

Preferably, the optical fiber connecting system 10 includes a shutter system. In this embodiment, the connection block 40 includes a shutter assembly 94, in which a shutter 96 lowers to prevent radiation delivery from the source 26 when the system 10 is disconnected (as shown in FIGS. 2–4) and rises to allow for such delivery when the system is connected (as shown in FIG. 1). The shutter 96 may also function as a contamination shield when in the lowered position, preventing contamination of the radiation source 26 from the environment when the system 10 is disconnected.

According to this preferred embodiment, the connection block 40 includes a shutter 96 located along the channel 44. The shutter 96 is movable between a blocking position (as shown in FIGS. 2–4) and an open position (as shown in FIG. 1). When the shutter 96 is in the blocking position, it interrupts the channel 44 and thus, interrupts the transmission of radiation from the radiation source 26 along the channel. This interruption occurs at a point P along the channel 44, as shown in FIG. 3. When the shutter 96 is in the open position, it is out of such interrupting relation with the channel 44, as shown in FIG. 1.

As shown in FIG. 3, the shutter 96 is in the blocking position when the connector body 60 is located proximally relative to the point P. The shutter 96 is in the open position when the distal end 62 of the connector body is located distally relative to the point P, as shown in FIG. 1. Preferably, the shutter 96 is moved between its blocking and open positions by way of the axial movement of the distal portion 68 of the connector body 60 within the channel 44. According to this embodiment, the system 10 provides a convenient safety mechanism which ensures that radiation is not transmitted from the connection block 40 when the connector body 60 is not extended sufficiently into the channel 44 for proper operation of the system.

As described above, the connector system 10 may be constructed for compatibility with ferrules, optical fiber connectors and bulkhead connectors, which are standard in industry. For example, as shown in FIG. 5, the connector body 60 is constructed to be compatible with a standard SMA 905 ferrule 106 and a standard SMA 905 bulkhead connector 112.

As is standard in current applications, the optical fiber 12 (not shown in FIG. 5) is circumferentially surrounded by the SMA 905 ferrule 106. According to this embodiment, the connector body 60 is adapted to receive the ferrule 106 therein when the ferrule is simply advanced into the connector body under pressure sufficient to snap the ferrule lip 108 into the gap 66 of the connector body. By way of example, connector body 60 may include a flexible snapping mechanism 120, such as at least one lever arm, ridge, spring or the like, which is displaced outwardly in a radial direction (schematically shown by arrows 0 in FIG. 5) by the ferrule lip 108 when the ferrule 106 is advanced sufficiently into the connector body and resiliently snaps inwardly in a radial direction (schematically shown by arrows I in FIG. 5) when the ferrule is further advanced into the connector body such that the snapping mechanism 120 fits over the ferrule lip 108 for engagement therewith. The ferrule 106 is thus snapped into the connector body, while being freely rotatable therein.

In this embodiment, the connector body 60 includes a threaded portion 118 along the inner circumference 64 of the distal portion 68 thereof. The threaded portion 118 is threaded to mate with corresponding threads 114 on the outer circumference 116 of the SMA 905 bulkhead connector 112. Thus, the connector body 60 is adapted to be screwed onto the standard bulkhead connector 112. The connector body 60 is physically more substantial, for example, longer, than the standard SMA 905 optical fiber connector. Consequently, the connector body 60 is screwed onto the standard bulkhead connector 112 more easily and controllably than is the standard optical fiber connector. The system 10 thus provides an efficient and reliable means of connection which accommodates standard components.

As the connector body 60 is rotated to connect and to disconnect it from the standard bulkhead connector 112, the biasing component 70 thereof experiences forces, such as insertion, rotational, and withdrawal forces, that are different from those associated with the snap-fit connection system described herein in relation to FIG. 1. Thus, the biasing component 70 is constructed sufficiently to accommodate movement of the connector body 60 to screw the threaded portion 116 thereof and the correspondingly threaded portion 114 of the standard bulkhead connector 112 together. The biasing component 70 thus remains of a construction sufficient to provide the biasing force F sufficient to seat the ferrule shoulder 24 (not shown) relative to the seating surface 38 of the bulkhead 32.

According to this alternate embodiment, the optical fiber connecting system 10 is thus compatible with components that are standard in industry. Thus, the user can employ existing components with the connecting system, thereby avoiding reconfiguration effort and expense.

According to another embodiment of the invention, the connector body 60 preferably includes a peripheral structure 98 of a construction sufficient to minimize the rolling of the connector body 60 over a surface. As shown in FIGS. 2 and 3, the peripheral structure 98 is located at a point where the connector body 60 is greatest in diameter. Preferably, this peripheral structure 98 is an annular ring which includes at least one protrusion 100. The protrusion 100 is dimensioned such that it extends outwardly relative to the outer circumference of the connector body 60 at its point of greatest diameter, such as the outer circumference of the switch-activating element 80. Preferably, three such protrusions 100 are approximately evenly spaced from one another along the outer circumference of the peripheral structure 98, for example, separated by 120° along the outer circumference of the annular peripheral structure 98, as shown in FIG. 2. The peripheral structure 98 is particularly useful for arresting any rolling of the connector body 60 when the connector body is disconnected from the system 10 and laid on a flat surface, such as a table.

According to yet another preferred embodiment, the connector body 60 includes a handle portion 102 which is located proximally relative to the connecting portion 72, as shown in FIG. 1. The handle 102 facilitates the user's manipulation of the connector body 60 for connection to, and disconnection from, the connector system 10. Preferably, the handle 102 is constructed to facilitate the user's single-handed manipulation of the connector body 60.

The handle 102 preferably includes a grip portion 104 which further facilitates user manipulation of the connector body 60 when the user's hand or glove (i.e., a surgical glove) is wet. As shown in FIG. 1, the diameter of the handle 102 is greatest in the grip portion 104 and is preferably of a diameter sufficient to provide a sufficient grip for user ease and comfort. The grip portion 104 may include a modified surface, such as a roughened or textured surface, to provide friction between the surface and the user's hand for a better grip.

The handle 102 may be formed as part of the connector body 60 or as a separate part to be added to the connector body. The handle 102 and its grip portion 104 are preferably designed for user ease and comfort. Thus, the system 10 provides a connector 60 which is easily manipulated by the user to connect an optical fiber 12 and a radiation source 26.

According to another aspect of the present invention, a fiber optic radiation delivery system 10 is provided which includes a length of optical fiber 12 extending from a first end 15 to a second end 14, a radiation emitter 17 attached to the first end, and a connector 60, as described herein, which carries the optical fiber and connects the optical fiber in a seated and biased configuration such that radiation is provided between the first and second ends. According to yet another aspect of the present invention, a connector assembly 10 is provided which includes a length of optical fiber having a connection end 14, and a connector 60, as described herein, which carries the optical fiber and connects the optical fiber in a seated and biased configuration. In these two aspects of the invention, the connector 60 has a seating surface 24 disposed therein beyond which the optical fiber end 14 extends a predetermined distance D which is appropriate for establishing the optical fiber 12 in a seated and biased configuration within the system 10. Thus, the present invention provides a system of appropriate dimension and configuration for establishing an optical fiber in a seated and biased configuration. Such an optical fiber configuration is useful for such purposes as establishing good physical and optical connection between an optical fiber and a radiation source.

Although the various aspects of the present invention have been described with respect to the preferred embodiments thereof, it will be understood that the invention is entitled to protection within the full scope of the appended claims.

It is claimed:

1. A method of connecting an optical fiber to a radiation source for transmitting radiation therefrom, comprising:
   providing a radiation source which is associated with a connection port;
   providing an optical fiber which has a radiation-transmitting end and a connection end;
   providing a ferrule surrounding the optical fiber, the ferrule having a shoulder;
   providing a connector carrying the ferrule therein such that the shoulder is accessible through a distal end of the connector, the connector including a biasing component sufficient to seat the shoulder relative to the radiation source under a biasing force and a connecting portion sufficient to engage the connection port;
   providing information on the connector body which identifies the optical fiber; and
   extending the connector toward the radiation source to seat the shoulder and to engage the connection port.

2. The method of claim 1, further comprising detecting the information upon said extending of the connector.

3. The method of claim 2, further comprising providing the radiation source with irradiation parameters upon said detecting of the information.

4. The method of claim 2, further comprising providing an emitter at the radiation-transmitting end, the emitter characterized by emitting light from a surface along a length thereof.

5. The method of claim 4 wherein the providing of the emitter further comprises providing a temperature sensor at a distal end portion of the emitter.

6. The method of claim 4 wherein the providing of the emitter further comprises providing a temperature sensor along a length of the emitter.

7. The method of claim 4 wherein the emitter is adapted for insertion into a material to be treated.

8. The method of claim 7 wherein the material is bodily tissue.

9. The method of claim 8 wherein the tissue is prostatic tissue.

10. The method of claim 9 wherein the tissue is affected by benign prostatic hypertrophy.

11. The method of claim 8 wherein the emitter is adapted to irradiate the tissue sufficiently to necrose a volume thereof.

12. A method of connecting an optical fiber to a radiation source, comprising:
   providing an optical fiber which has a connection end;
   providing a ferrule surrounding the optical fiber, the ferrule having a shoulder;
   providing a connection block including a connection port and a channel;
   providing a radiation source in communication with the connection block, the radiation source having an opening for receiving the connection end therein and a seating surface for receiving the ferrule shoulder thereagainst whereupon the connection end is in optical communication with the radiation source;
   providing a connector body carrying the ferrule therein such that the shoulder is accessible through a distal end of the connector body, the connector body including a biasing portion sufficient to seat the shoulder relative to the seating surface under a biasing force and a connecting portion sufficient to engage the connection port, the connector body extendable into the channel to bring the shoulder into contact with the seating surface, to seat the shoulder relative to the seating surface and to engage the connection port;
   providing information on the connector body which identifies said optical fiber; and
   extending the connector body into the channel to seat the shoulder and to engage the connection port.

13. The method of claim 12, further comprising detecting the information upon said extending of the connector body.

14. The method of claim 13, further comprising providing the radiation source with irradiation parameters upon said detecting of the information.

15. A method of providing radiation from an optical fiber, comprising:
   providing a length of optical fiber having first and second ends;

providing a radiation emitter at the first end;

providing a connector carrying the optical fiber therein such that the second end is accessible through an open distal end of the connector, the connector including a connecting portion and a biasing component and having a seating surface disposed therein;

providing information on the connector body which identifies said optical fiber;

seating the optical fiber via the seating surface under a biasing force provided by the biasing component; and connecting the optical fiber via the connecting portion to provide radiation between the first and second ends.

16. The method of claim 15, further comprising detecting the information upon said connecting of the optical fiber.

17. The method of claim 16, further comprising providing the radiation source with irradiation parameters upon said detecting of the information.

18. The method of claim 15 wherein the emitter is characterized by emitting light from a surface along a length thereof.

19. The method of claim 15 wherein the providing of the emitter further comprises providing a temperature sensor at a distal end portion of the emitter.

20. The method of claim 15 wherein the providing of the emitter further comprises providing a temperature sensor along a length of the emitter.

21. The method of claim 15 wherein the emitter is adapted for insertion into a material to be treated.

22. The method of claim 21 wherein the material is bodily tissue.

23. The method of claim 22 wherein the tissue is prostatic tissue.

24. The method of claim 23 wherein the tissue is affected by benign prostatic hypertrophy.

25. The method of claim 22 wherein the emitter is adapted to irradiate the tissue sufficiently to necrose a volume thereof.

26. A method of connecting an optical fiber to a light source for transmitting light therefrom, comprising:

providing a source of light energy, the source associated with a connection port;

providing an optical fiber which has a light-transmitting end and a connection end;

providing an emitter at the light-transmitting end, said emitter characterized by emitting light from a surface along a length thereof; and providing a ferrule surrounding the optical fiber, the ferrule having a shoulder;

providing a connector carrying the ferrule therein such that the shoulder is accessible through a distal end of the connector, the connector including a biasing component sufficient to seat the shoulder relative to the source under a biasing force and a connecting portion sufficient to engage the connection port; and extending the connector toward the source to seat the shoulder and to engage the connection port.

27. The method of claim 26 wherein the providing of the emitter comprises providing a light-transmissive first material surrounding the first end and a light-transmissive second material surrounding the first material, the first and second materials defining a light guide when light is transmitted from the end of the optical fiber to the first material, and the second material having an internal surface modified sufficiently to transmit light travelling along the light guide to an outside surface along a length of the second material.

28. The method of any one of claims 26 and 27, further comprising providing information on the connector which identifies the optical fiber.

29. The method of claim 28, further comprising detecting the information upon said extending of the connector.

30. The method of claim 29, further comprising providing the source with light-irradiation parameters upon said detecting of the information.

31. The method of claim 27 wherein the providing of the emitter further comprises providing a temperature sensor in a distal end portion of the first material.

32. The method of claim 27 wherein the providing of the emitter further comprises providing a temperature sensor along a length of the first material adjacent to the internal surface of the second material.

33. The method of any one of claims 31 and 32 wherein the temperature sensor is an optical temperature sensor.

34. The method of any one of claims 26 and 27 wherein the emitter is adapted for insertion into a material to be treated.

35. The method of claim 34 wherein the material is bodily tissue.

36. The method of claim 35 wherein the tissue is prostatic tissue.

37. The method of claim 36 wherein the tissue is affected by benign prostatic hypertrophy.

38. The method of claim 35 wherein the emitter is adapted to irradiate the tissue sufficiently to necrose a volume thereof.

39. A method of providing light from an optical fiber, comprising:

providing a length of optical fiber having first and second ends;

providing a light-transmissive first material surrounding the first end and a light-transmissive second material surrounding the first material, the first and second materials defining a light guide when light is transmitted from the end of the optical fiber to the first material, the second material having an internal surface modified sufficiently to transmit light travelling along the light guide to an outside surface along a length of the second material;

providing a connector carrying the optical fiber therein such that the second end is accessible through an open distal end of the connector, the connector including a connecting portion and a biasing component and having a seating surface disposed therein;

seating the optical fiber via the seating surface under a biasing force provided by the biasing component; and connecting the optical fiber via the connecting portion to provide radiation between the first and second ends.

40. The method of claim 39, further comprising providing information on the connector which identifies the optical fiber.

41. The method of claim 40, further comprising detecting the information upon said connecting of the optical fiber.

42. The method of claim 41, further comprising providing the radiation source with irradiation parameters upon said detecting of the information.

43. The method of claim 39 wherein the providing of the emitter further comprises providing a temperature sensor in a distal end portion of the first material.

44. The method of claim 39 wherein the providing of the emitter further comprises providing a temperature sensor along a length of the first material adjacent to the internal surface of the second material.

45. The method of any one of claims 43 and 44 wherein the temperature sensor is an optical temperature sensor.

46. The method of claim 39 wherein the emitter is adapted for insertion into a material to be treated.

47. The method of claim 46 wherein the material is bodily tissue.

48. The method of claim 47 wherein the tissue is prostatic tissue.

49. The method of claim 48 wherein the tissue is affected by benign prostatic hypertrophy.

50. The method of claim 47 wherein the emitter is adapted to irradiate the tissue sufficiently to necrose a volume thereof.

* * * * *